US012221511B2

United States Patent
Zhou et al.

(10) Patent No.: US 12,221,511 B2
(45) Date of Patent: Feb. 11, 2025

(54) CURING COMPOSITION

(71) Applicant: Evonik Operations GmbH, Essen (DE)

(72) Inventors: Liyin Zhou, Shanghai (CN); Qiubai Peng, Shanghai (CN)

(73) Assignee: Evonik Operations GmbH, Essen (DE)

( * ) Notice: Subject to any disclaimer, the term of this patent is extended or adjusted under 35 U.S.C. 154(b) by 60 days.

(21) Appl. No.: 17/611,817

(22) PCT Filed: May 16, 2019

(86) PCT No.: PCT/CN2019/087157
§ 371 (c)(1),
(2) Date: Nov. 16, 2021

(87) PCT Pub. No.: WO2020/228002
PCT Pub. Date: Nov. 19, 2020

(65) Prior Publication Data
US 2022/0251286 A1    Aug. 11, 2022

(51) Int. Cl.
```
C08G 59/50    (2006.01)
C08G 59/42    (2006.01)
C09J 163/00   (2006.01)
F01D 5/12     (2006.01)
```

(52) U.S. Cl.
CPC ....... *C08G 59/4207* (2013.01); *C08G 59/502* (2013.01); *C08G 59/5026* (2013.01); *C08G 59/506* (2013.01); *C09J 163/00* (2013.01); *F01D 5/12* (2013.01); *C08G 2170/00* (2013.01)

(58) Field of Classification Search
None
See application file for complete search history.

(56) References Cited

U.S. PATENT DOCUMENTS

| | | | |
|---|---|---|---|
| 3,983,056 A | 9/1976 | Hosoda et al. | |
| 4,946,933 A | 8/1990 | Speranza et al. | |
| 5,097,070 A | 3/1992 | Lin et al. | |
| 5,106,945 A * | 4/1992 | Hare | C08G 59/26 |
| | | | 252/182.28 |
| 5,576,416 A * | 11/1996 | Walker | C08G 69/34 |
| | | | 528/340 |
| 10,253,225 B2 | 4/2019 | van Gorkom et al. | |
| 2003/0065084 A1* | 4/2003 | MacQueen | C11D 3/37 |
| | | | 524/538 |
| 2007/0225451 A1* | 9/2007 | Haubennestel | C08G 18/2825 |
| | | | 525/440.02 |
| 2007/0287809 A1* | 12/2007 | Vedage | C08G 59/44 |
| | | | 525/423 |
| 2008/0227928 A1* | 9/2008 | Vedage | C08G 59/54 |
| | | | 525/423 |
| 2018/0162991 A1* | 6/2018 | Ortelt | C08G 59/506 |

FOREIGN PATENT DOCUMENTS

| | | |
|---|---|---|
| JP | S50-61429 A | 5/1975 |
| JP | H3-162415 A | 7/1991 |
| JP | H02-265925 A | 10/1991 |
| WO | 2014/013248 A1 | 1/2014 |
| WO | 2017/218934 A1 | 6/2017 |

OTHER PUBLICATIONS

National Oceanic and Atmospheric Administration. "Chemical Datasheet Melamine". Cameo Chemicals, Apr. 4, 2024, https://cameochemicals.noaa.gov/chemical/20588 (Year: 2024).*
International Search Report and Written Opinion for Application No. PCT/CN2019/087157 dated Feb. 20, 2020 (5 pages).
International Search Report, PCT/CN2019/087157, dated Feb. 19, 2020, 3 pages.
Written Opinion, PCT/CN2019/087157, dated Feb. 20, 2021, 4 pages.

* cited by examiner

*Primary Examiner* — Megan Mcculley
(74) *Attorney, Agent, or Firm* — Michael Best & Friedrich LLP

(57) ABSTRACT

The present disclosure relates to a curing composition comprising: a) a condensation product of at least one carboxylic acid having 20-60 carbon atoms and at least two carboxyl groups and/or at least one ester derived from a carboxylic acid having 20-60 carbon atoms and at least two carboxyl groups; and at least one polyoxyalkyleneamine, wherein the polyoxyalkyleneamine includes: I) at least two oxyalkylene moieties; and II) at least two primary amino groups; and b) at least one amine having at least one amino group. Also provided are an adhesive composition comprising the curing composition, usage of the adhesive, a turbine blade for wind energy comprising the adhesive composition, and a method for manufacturing the curing composition.

20 Claims, No Drawings

CURING COMPOSITION

CROSS-REFERENCE TO RELATED APPLICATION

This patent application is the U.S. national stage entry, under 35 U.S.C. § 371, of International Application Number PCT/CN2019/087157, filed May 16, 2019, the entire contents of which is hereby incorporated by reference.

FIELD OF THE DISCLOSURE

The present disclosure relates to the field of polymer composition, and particularly to a curing composition, and further particular to a curing composition for an epoxy resin.

BACKGROUND

Wind energy industry needs large wind turbine blades for power generation. A blade usually consists of two shells which are bonded together with a structural adhesive. Most of the case, epoxy resin adhesive is used as the structural adhesive.

Many epoxy resin adhesives used in the turbine blades are two-component adhesive, which often includes a conventional epoxy resin or epoxy resin mixture, a curing agent and possibly a curing accelerator, and optionally a solvent or a solvent mixture to adjust the viscosity or solubility. Curing agents are ingredients or additives that are used to cure and harden varied materials. These agents aid to make a cross-linking within the ingredients that help to harden and deliver strength to the products.

Epoxy curing agents are preferred for epoxy resins for wind blade fabrications due to high sheer, compressive strength, and light weight. The fatigue performance of epoxy curing agents improves the composite mechanical properties in rotor blades, thereby, enhancing the performance of wind turbine.

As demand for wind energy keeps growing, dimensions of turbine blades, especially those located offshore, are increasing significantly. Lengths of large blades may exceed 70 meters. The increased dimensions of blades cause an elongated duration of the process during which the epoxy resin adhesive is applied to the blades. Occasionally, the epoxy resin adhesive may be cured before the adhesive is completely applied. The premature curing introduces difficulties for blade assembly.

Besides, the curing process sometimes occurs accompanied by an enormous release of heat. The exothermic effect may lead to a rapid increase of temperature and uncontrollable reactions between components within the adhesive composition, further undermining the manufactured products.

Thus, the industry requires an epoxy resin adhesive, which has an extended pot life, a reduced exothermic effect during curing process.

SUMMARY

One objective of the present disclosure is to provide a curing composition, which, when combined with epoxy resin, can form a two-component adhesive composition with a long pot life.

This objective of the present disclosure is achieved by a curing composition comprising:
a) a condensation product of:
at least one carboxylic acid having 20-60 carbon atoms and at least two carboxyl groups and/or at least one ester derived from a carboxylic acid having 20-60 carbon atoms and at least two carboxyl groups; and
at least one polyoxyalkyleneamine, wherein the polyoxyalkyleneamine includes:
I) at least two oxyalkylene moieties; and
II) at least two primary amino groups; and
b) at least one amine having at least one amino group.

Another objective of the present disclosure is to provide an adhesive composition consisting of the curing composition of the present disclosure and an epoxy resin.

Another objective of the present disclosure is to provide a usage of the adhesive composition of the present disclosure.

Another objective of the present disclosure is to provide a turbine blade for wind energy comprising the adhesive composition of the present disclosure.

A further objective of the present disclosure is to provide a method for manufacturing a curing composition.

DETAILED DESCRIPTION

The following description is used merely for illustration but is not to restrict the scope of the disclosure.

[Polyoxyalkyleneamine]

Polyoxyalkyleneamine, sometimes termed "polyetheramine" or "poly(alkyleneoxy) amine", is a group of organic amines with one or more amino groups attached to polyether backbone. Amino groups include primary amino group ($-NH_2$), secondary amino groups ($-NHR$, wherein R is an organic radical other than H atom), and tertiary amino groups ($-NR_1R_2$, wherein $R_1$ and $R_2$ are independently organic radicals other than H atom).

The polyether backbone in polyoxyalkyleneamines used herein contains at least two oxyalkylene moieties ($OC_nH_{2n}$, n being an integer of 2 to 10). In some preferable embodiments, the number of oxyalkylene moiety is larger than 2, for example, 3, 4, or 5. The oxyalkylene moiety may preferably be selected from oxyethylene ($-OCH_2CH_2-$), oxypropylene ($-OCH(CH_3)CH_2-$, or $-OCH_2CH_2CH_2-$), oxybutylene ($-OCH(CH_3)CH(CH_3)-$, $-OCH(CH_2CH_3)CH_2-$, and $-OC(CH_3)_2CH_2-$), or any other similar group having the chemical formula ($OC_nH_{2n}$, n being an integer of 2 to 10). The oxyalkylene moieties may preferably be identical or different, for example, a mixture of oxyethylene and oxypropylene.

The polyoxyalkyleneamine used in the present disclosure has at least two primary amino groups, for example, Jeffamine® D series polyetheramines. In some preferable embodiments, the polyoxyalkyleneamine has three or more primary amino groups, for instance, Jeffamine® T series polyetheramines may be used.

In some preferable embodiments, the polyoxyalkyleneamine includes a polyoxyethyleneamine, having the following formula:

wherein x is an integer ranging from 2 to 70. Specific examples are Jeffamine® EDR series diamines from Huntsman Corporation.

In some preferable embodiments, the polyoxyalkyleneamine includes a polyoxypropyleneamine, having the following formula:

wherein x is an integer ranging from 2 to 70. Specific examples are Jeffamine® D series diamines from Huntsman Corporation.

In some preferable embodiments, the polyoxyalkyleneamine includes a polyoxybutyleneamine, having the following formula:

wherein x is an integer ranging from 2 to 70.

In some preferable embodiments, the polyoxyalkyleneamine includes a polyoxybutyleneamine, having the following formula:

wherein x is an integer ranging from 2 to 70.

In some preferable embodiments, the polyoxyalkyleneamine includes a poly(oxypropylene-co-oxyethylene) amine, having the following formula:

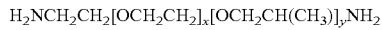

wherein x and y are integers independently ranging from 2 to 70.

In some preferable embodiments, the polyoxyalkyleneamine includes a poly(oxypropylene-co-oxyethylene) amine, having the following formula:

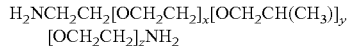

wherein x, y and z are integers independently ranging from 2 to 70.

In some preferable embodiments, the polyoxyalkyleneamine includes a poly(oxypropylene-co-oxyethylene) amine, having the following formula:

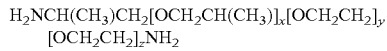

wherein x, y and z are integers independently ranging from 2 to 70. Specific examples are Jeffamine® HK511 diamine (prepared by aminating a diethylene glycol grafted with propylene oxide, with an average molar mass of 220.) or Jeffamine® ED series diamines from Huntsman Corporation.

In some preferable embodiments, the polyoxyalkyleneamine is based on a poly(tetramethylene ether) glycol and polypropylene glycol copolymer, for example, having the following formula:

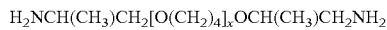

wherein x is an integer ranging from 1 to 70. Specific examples are Jeffamine® THF series diamines from Huntsman Corporation.

In some preferable embodiments, the polyoxyalkyleneamine includes a poly(oxypropylene-co-oxyethylene) amine, having the following formula:

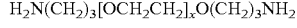

wherein x is an integer ranging from 1 to 70. Specific examples are 1,13-diamino-4,7,10-trioxatridecane (Ancamine® 1922A from Evonik Resource Efficiency GmbH) or 4,7-dioxadecane-1,10-diamine.

In some preferable embodiments, the polyoxyalkyleneamine includes a polyoxypropyleneamine, having the following formula:

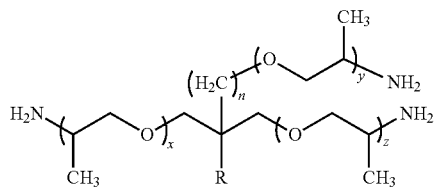

wherein, R is a radical selected from H, $CH_3$, $CH_2CH_3$, $CH_2CH_2CH_3$, or $CH(CH_3)_2$; n is 0 or 1; x, y, and z are integers independently ranging from 1 to 30; and the sum of x, y, and z is ranging from 3 to 90. Specific examples are Jeffamine® T series triamines from Huntsman Corporation.

It will be appreciated that polyoxyalkyleneamines used in the present disclosure may be a mixture of polymers or oligomers having varying degrees of polymerization. For example, when polyoxypropyleneamine is used, the repeating number x as in $H_2NCH(CH_3)CH_2[OCH_2CH(CH_3)]_xNH_2$ may be within a distribution, for example, a distribution ranging from 2 to 30, rather than a specific integer.

In some preferable embodiments, a diamine, triamine, or tetraamine that has a primary amino-terminated polyoxyalkylene backbone may be employed. Specific examples include Jeffamine® RFD270 amine from Huntsman Corporation, which contains both rigid cycloaliphatic and flexible polyetheramine segments in the same molecule. Other reference may be made to Jeffamine® XTJ616 from Huntsman Corporation, which comprises a polyetheramine based on pentaerythritol and propylene oxide with an average molecular weight of about 660.

The above mentioned polyoxyalkyleneamines are commercially available from various chemical manufacturers. For example, Jeffamine® D230, Jeffamine® D400, Jeffamine® D2000, Jeffamine® D4000, Jeffamine® ED600, Jeffamine® ED900, Jeffamine® ED2003, Jeffamine® EDR104, Jeffamine® EDR148, Jeffamine® EDR176, Jeffamine® EDR192, Jeffamine® THF100, Jeffamine® THF140, Jeffamine® THF170, Jeffamine® T403, Jeffamine® T3000, Jeffamine® T5000, Jeffamine® RFD270, Jeffamine® XTJ616 from Huntsman Corporation; Baxxodur® EC 301, Baxxodur® EC 310, Baxxodur® EC 302, Baxxodur® EC 303, Baxxodur® EC 311 from BASF SE; or Ancamine® 1922A from Evonik Resource Efficiency GmbH.

[Carboxylic Acid]

One or more carboxylic acids having 20-60 carbon atoms and at least two carboxyl groups are used in the present disclosure. Preferably, the carboxylic acid takes the form of a dimerized fatty acid. However, it's appreciated that higher orders of oligomerized fatty acids, such as, trimers, tetramers, may be adopted as the carboxylic acid. Also, other multi-carboxylic acids may be employed.

In addition, or alternatively, one or more esters derived from a carboxylic acid having 20-60 carbon atoms and at least two carboxyl groups can be used. Preferable are C1 to C4 alkyl ester.

The term dimerized fatty acid, or dimer fatty acid, is well known in the art and refers to the dimerization product of mono- or polyunsaturated fatty acids and/or esters thereof. Preferred dimer fatty acids are dimers of C10 to C30, more preferably C12 to C24, particularly C14 to C22, and especially C16 to C20 alkyl chains. Particularly preferred dimer fatty acids include dimerization products of palmitoleic acid (C16), stearic acid (C18), oleic acid (C18), linoleic acid (C18), linolenic acid (C18), elaidic acid (C18), gondoic acid (C20), or mixture thereof. The dimerization products of the unsaturated fatty acid mixtures obtained in the hydrolysis of natural fats and oils, e.g. sunflower oil, soybean oil, olive oil, rapeseed oil, cottonseed oil, jujuba oil, and tall oil, may also be used. After dimerization, the mixture may be hydrogenated (partially or fully), to generate saturated dicarboxylic acid, tricarboxylic acid, etc.

Particularly preferred for the purposes of the present disclosure are dimerized fatty acid with a dimer content as measured by gas chromatography ranging from 50 wt. % to 95 wt. %, preferably from 60 wt. % to 90 wt. %; and a trimer and higher acid content of from 3 wt. % to 40 wt. %, preferably from 5 wt. % to 20 wt. %.

Preferred dimerized fatty acids are those with a range of dimeric acids from 75 wt. % to 90 wt. %. The above mentioned dimerized fatty acids are commercially available from chemical manufacturers. For example, Pripol® 1006, 1009, 1013, 1017, 1022, 1025, and 1029 dimer acids (Croda Coatings & Polymers), Empol®1018 and 1019 (Cognis Corp.), Haridimer™ 250S (Harima M.I.D., Inc.), and Unidyme® 18 and SYLVADYME™ T18 (Arizona Chemical Co.).

[Polyetheramide]

Herein the term "polyetheramide" is used to denote a condensation product or mixture of condensation products formed from the reaction between one or more carboxylic acids having 20-60 carbon atoms and at least two carboxyl groups and/or the corresponding ester(s) with one or more polyoxyalkyleneamines. When a mixture of carboxylic acids and polyoxyalkyleneamine is heated, the mixture can undergo a condensation reaction and a mixture of polyetheramides can be produced.

The condensation reaction occurs by heating to a temperature of 120° C. to 280° C. The elevated temperature ensures that water, as co-product of the condensation, can be removed from the mixture. The heating condition endures for 0.5 to 10 hours, preferably 1 to 5 hours. Preferably, the heating condition is accompanied by a rigorous stirring, for example, under 100 RPM, 150 RPM, or 200 RPM stirring.

To prevent side reactions such as oxidation, a non-oxidative atmosphere can preferably be applied during the condensation. The non-oxidative atmosphere can be formed preferably by charging nitrogen gas, or any other inert or reductive gas, e.g., argon.

The stoichiometry of carboxylic acid and/or ester to polyoxyalkyleneamine in the present disclosure is preferably 0.01-0.8:1, more preferably 0.1-0.5:1, and more preferably 0.1-0.4:1.

The polyamide formed by the condensation reaction between acid/ester and polyamine under the given conditions contains reactive primary and secondary amines in its molecules. The reactive primary and secondary amines are key to curing of epoxy resins. In the present disclosure, polyoxyalkyleneamine and carboxylic acid having 20-60 carbon atoms and at least two carboxyl groups and/or the corresponding esters are used, thus reducing the concentration or density of reactive groups in the whole molecule, leading to a reduction of exothermic effect and an extension of pot life. It has been found that by controlling the stoichiometry as well as other conditions, a desired level or concentration of free or unreacted primary amino groups within the polyetheramide can be realized.

[Amines]

Amines used herein are organic amines with at least one amino group. The amine differs from the polyoxyalkyleneamine from which the condensation product is derived.

Preferably, the amine is cyclic and has at least one carbon ring or ring with one or more heteroatoms (e.g., pyrrolidine, tetrahydrofuran, and piperidine). More preferably, the amine has at least two carbon rings or rings with one or more heteroatoms each.

Preferably, the amine has at least two amino group. Among the at least two amino groups, at least one is a primary amino group. Specifically, amines with at least one primary amino group attached directly or indirectly (e.g., through a methylene moiety —CH$_2$—) to the ring are preferred. The amines are preferably aliphatic or semi-aliphatic. However, araliphatic or aromatic amines might also be used.

Preferably, the amine includes at least one five-membered or six-membered ring. Still preferably, the amine includes at least two five-membered or six-membered carbon rings. In some cases, the two six-membered carbon rings are connected through a methylene group (—CH$_2$—).

The amine used in the curing composition according to the present disclosure may be a unitary component system or a mixture of at least two amine species.

Specifically, the amine preferably includes one or more compounds selected from 1-aminopyrrolidine, 2-aminopyrrolidine, 3-aminopyrrolidine, 1,2-diaminocyclohexane, 1,3-bis (aminomethyl)cyclohexane, 1,4-bis (aminomethyl)cyclohexane, m-xylylenediamine (MXDA), p-xylylenediamine (PXDA), 3-aminomethyl-3,5,5-trimethylcyclohexylamine (isophorone diamine, IPD), 1-amino-1-methyl-4-(2-amino-2-propyl)cyclohexane, 3,3'-dimethyl-4,4'diaminodicyclohexyl methane (DMDC), 4,4'-(1-methylethylidene)bis[cyclohexanamine], 4,4'-ethylidenebis[cyclohexanamine], 4,4'-diaminodicyclohexylmethane, 2,4'-diaminodicyclohexylmethane, 2,2'-diaminodicyclohexylmethane (also referred to as PACM), or a mixture manufactured by hydrogenation (fully or partially) of methylene dianiline, or dimethylenetri(cyclohexylamine), as follows:

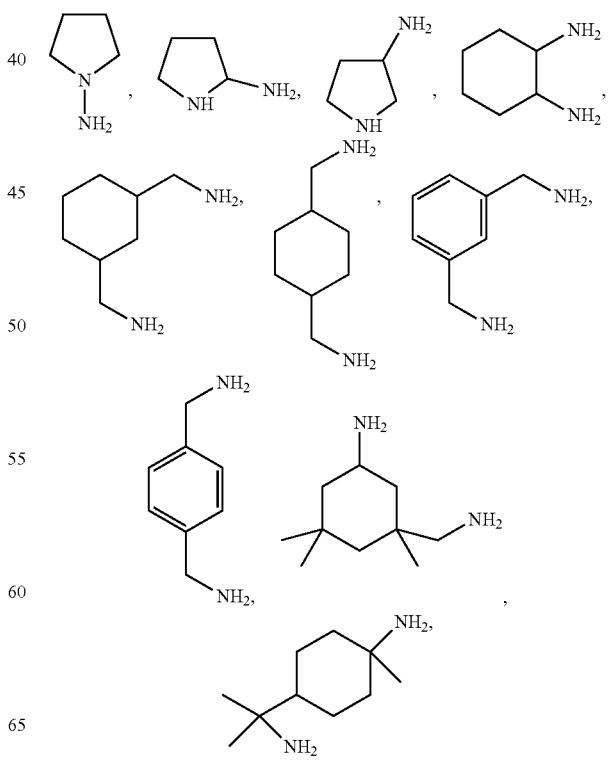

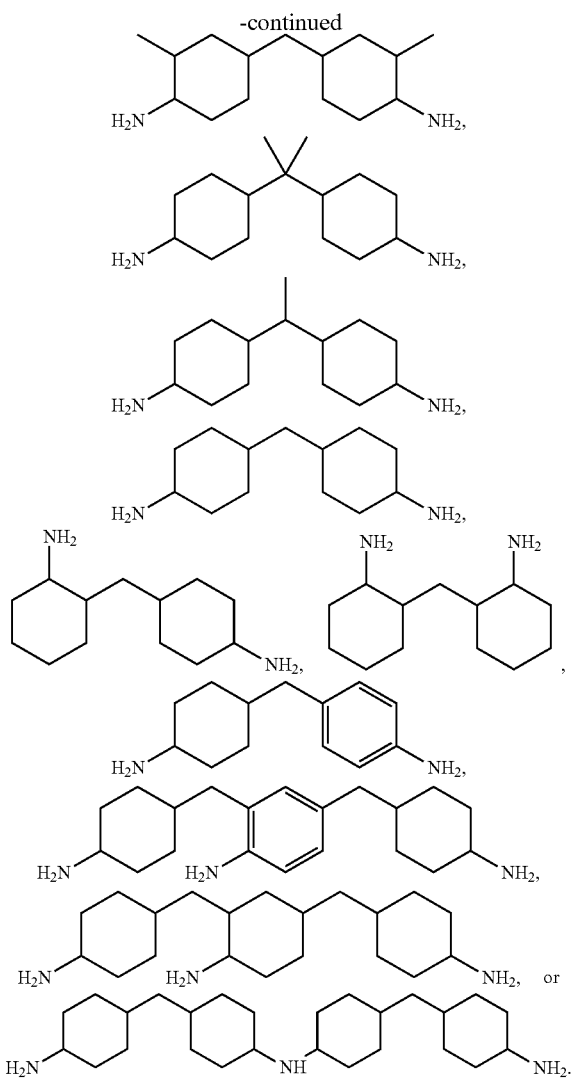

Other preferred amines include, alone or in mixtures, 1,3-diaminocyclohexane, 1,4-diaminocyclohexane, 4-methyl-1,3-cyclohexanediamine, N-cyclohexyl-1,3-propanediamine, 1,2-bis (aminomethyl)cyclohexane, 1,3-bis (aminomethyl)cyclohexane, 2,2'-dimethyl-4,4'-methylenebis (cyclohexylamine), 3,3'-dimethyl methylene dicyclohexylamine, TCD diamines (3(4),8(9)-bis(aminomethyl)tricyclo[5.2.1.02,6]decane), etc.

In preferred embodiments, 2-(3-(aminomethyl)-3,5,5-trimethylcyclohexyl) propane-1,3-diamine (AM-CPDA), as shown below, may also be used.

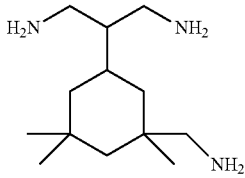

Some of the above-mentioned amines are commercially available from chemical manufacturers. For example, 1,2-diaminocyclohexane, commercially available as Ancamine® 1770; 3-aminomethyl-3,5,5-trimethylcyclohexylamine, commercially available as Vestamin® IPD; hydrogenated methylene dianiline, commercially available as Vestamin® PACM; 2,2'-dimethyl-4,4'-methylenebis (cyclohexylamine), commercially available as Ancamine® 2049; mixed polycycloaliphatic amines (MPCAs), commercially available as Ancamine® 2168; all from Evonik Resource Efficiency GmbH are used. Also, commercially available amines include Baxxodur® (EC 331, EC 252, EC 210, EC 201) from BASF SE, EPIKURE® curing agents (3300, 3370, 3378, 3380, 3381, 3382, 3383, 3387, 3388, 3389) from Hexion Inc.

The amines used herein can preferably be a mixture of several stereoisomers, such as, cis and trans isomers, or chiral isomers. The amines can preferably also be a mixture of amines having different chemical formula, such as, a mixture of Ancamine® 2049 and Ancamine® 2168.

Weight percentage of amines in the curing composition is preferably 1-99 wt. %, more preferably 1-90 wt. %, even more preferably 1 wt. % to 45 wt. %, still more preferably 5 wt. % to 35 wt. %.

While not bound to any theory, it is thought that amino group attached directly or indirectly to a ring has its contribution to the mechanical strength in the final adhesive composition. By incorporating amine into the curing composition, the glass transition temperature ($T_g$) of the curing composition is increased, and the adhesion strength is enhanced. Besides, the amine may introduce high chemical resistance to the adhesive composition, which is strongly desired in the wind energy industry.

[Epoxy Resins]

The curing composition of the present disclosure can be used with epoxy resins already known in the art, to form a two-composition adhesive composition. In the present disclosure, the epoxy resin can preferably be a bisphenol A epoxy resin, a bisphenol F epoxy resin, a bisphenol A/F epoxy resin, a novolac epoxy resin, a cycloaliphatic epoxy resin, a glycidylamine epoxy resin, or a combination thereof. Preferably, a bisphenol A or bisphenol F epoxy resin is used in the adhesive composition. The epoxy resins are commercially available from various chemical manufacturers, for example, D.E.R.™ 331, 351, or 731 from DOW Chemical Company. Several epoxy compounds are also described, for example, in EP 675 185 A1.

Useful compounds are a multitude of those known for this purpose that contain more than one epoxy group, preferably two epoxy groups, per molecule. These epoxy compounds can preferably either be saturated or unsaturated. They are preferably aliphatic, cycloaliphatic, aromatic or heterocyclic, and have hydroxyl groups. They preferably contain such substituents that do not cause any side reactions under the mixing or reaction conditions, for example alkyl or aryl substituents, ether moieties and the like. They are preferably glycidyl ethers which derive from polyhydric phenols, especially bisphenols and novolac, and which have molar masses based on the number of epoxy groups ME ("epoxy equivalent weights", "EV value") between 100 and 1500 g/eq, but especially between 150 and 250 g/eq.

Examples of polyhydric phenols include: resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulphone inter alia, and the chlorination and bromination products of the aforementioned compounds, for example tetrabromobisphenol A. Very particular preference is given to using liquid diglycidyl ethers based on bisphenol A and bisphenol F having an epoxy equivalent weight of 150 to 200 g/eq. It is also possible to use polyglycidyl ethers of polyols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ethers, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Further useful components A) include: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenyl)methane. The poly(N-glycidyl) compounds also include triglycidyl isocyanurate, triglycidylurazole and oligomers thereof, N,N'-diglycidyl derivatives of cycloalkyleneureas and diglycidyl derivatives of hydantoins inter alia.

In addition, it is also possible to use polyglycidyl esters of polycarboxylic acids which are obtained by the reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, naphthalene-2,6-dicarboxylic acid and higher diglycidyl dicarboxylates, for example dimerized or trimerized linolenic acid. Examples are diglycidyl adipate, diglycidyl phthalate and diglycidyl hexahydrophthalate.

Mention should additionally be made of glycidyl esters of unsaturated carboxylic acids and epoxidized esters of unsaturated alcohols or unsaturated carboxylic acids. In addition to the polyglycidyl ethers, it is possible to use small amounts of monoepoxides, for example methyl glycidyl ether, butyl glycidyl ether, allyl glycidyl ether, ethylhexyl glycidyl ether, long-chain aliphatic glycidyl ethers, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides such as epoxidized monounsaturated hydrocarbons (butylene oxide, cyclohexene oxide, styrene oxide), in proportions by mass of up to 30% by weight, preferably 10% to 20% by weight, based on the mass of the polyglycidyl ethers. A detailed enumeration of the epoxy compounds can be found in the handbook "Epoxidverbindungen and Epoxidharze" [Epoxy Compounds and Epoxy Resins] by A. M. Paquin, Springer Verlag, Berlin 1958, Chapter IV, and in Lee Neville's "Handbook of Epoxy Resins", 1967, Chapter 2.

Useful epoxy compounds preferably include glycidyl ethers and glycidyl esters, aliphatic epoxides, diglycidyl ethers based on bisphenol A and/or bisphenol F, and glycidyl methacrylates. Other examples of such epoxides are triglycidyl isocyanurate (TGIC, trade name: ARALDIT 810, Huntsman), mixtures of diglycidyl terephthalate and triglycidyl trimellitate (trade name: ARALDIT PT 910 and 912, Huntsman), glycidyl esters of versatic acid (trade name: CARDURA E10, Shell), 3,4-epoxycyclohexylmethyl 3,4'-epoxycyclohexanecarboxylate (ECC), ethylhexyl glycidyl ether, butyl glycidyl ether, pentaerythrityl tetraglycidyl ether (trade name: POLYPDX R 16, UPPC AG), and other Polypox products having free epoxy groups. It is also possible to use mixtures of the epoxy compounds mentioned.

Particularly preferred epoxy components are polyepoxides based on bisphenol A diglycidyl ether, bisphenol F diglycidyl ether, 4,4'-methylenebis[N,N-bis(2,3-epoxypropyl)aniline], hexanediol diglycidyl ether, butanediol diglycidyl ether, trimethylolpropane triglycidyl ether, propane-1,2,3-triol triglycidyl ether, pentaerythritol tetraglycidyl ether and diglycidyl hexahydrophthalate.

According to the present disclosure, it is also possible with preference to use mixtures of these epoxy compounds in the epoxy resin.

The epoxy resin may be in various forms, such as, a crystalline form, a powdered form, a semi-solid form, a liquid form, etc. For the liquid form, the epoxy resin may be dissolved in a solvent, for example, water. Preferably, the epoxy resin is in a liquid form, to facilitate the mixing process.

In the two-composition adhesive composition, the mass ratio of epoxy resin to curing composition preferably is in a range of 1:3 to 10:1, more preferably in a range of 1:1 to 5:1, even more preferably in a range of 2:1 to 3:1.

[Additives]

To bring in more functionality or features to satisfy industrial requirements, the curing composition can preferably include additives. Additives are understood to mean substances which are added to alter the properties of the epoxy composition in the desired direction, for example to match viscosity, wetting characteristics, stability, reaction rate, blister formation, storability or adhesion, and use properties, to the end application. Several additives are described, for example, in WO 99/55772, p. 15-25, and in "Plastics Additives, R. Gächter and H. Muller, Hanser Publishers 1983".

Preferred additives can be selected from the group consisting of fillers, reinforcing agents, coupling agents, toughening agents, defoamers, dispersants, lubricants, colorants, marking materials, dyes, pigments, IR absorbers, antistats, anti-blocking agents, nucleating agents, crystallization accelerators, crystallization delayers, conductivity additives, carbon black, graphite, carbon nanotubes, graphene, desiccants, de-moulding agents, levelling auxiliaries, flame retardants, separating agents, optical lighteners, rheology additives, photochromic additives, softeners, adhesion promoters, anti-dripping agents, metallic pigments, stabilizers, metal glitters, metal coated particles, porosity inducers, plasticizers, glass fibers, nanoparticles, flow assistants, and combinations thereof.

The additive preferably constitutes a proportion of not greater than 90 wt. %, preferably not greater than 70 wt. %, more preferably not greater than 50 wt. %, still more preferably not greater than 30 wt. %, with respect to the total weight of adhesive composition.

For example, it can be advantageous to add light stabilizers, for example sterically hindered amines, or other auxiliaries as described, for example, in EP 669 353 in a total amount of 0.05% to 5% by weight.

To produce the curing compositions of the present disclosure, it is additionally possible to add additives such as levelling agents, for example polysilicones, or adhesion promoters, for example those based on acrylate. In addition, still further components may optionally be present. Auxiliaries and additives used in addition may be chain transfer agents, plasticizers, stabilizers and/or inhibitors.

In some cases, the curing composition can preferably include an antioxidant additive. The antioxidant might include one or more of the structural units selected from sterically hindered phenols, sulfides or benzoates. Here, in sterically hindered phenols, the two orthohydrogens are substituted by compounds which are not hydrogen and preferably carry at least 1 to 20, particularly preferably 3 to 15, carbon atoms and are preferably branched. Benzoates also carry, preferably in the ortho position relative to the OH group, substituents which are not hydrogen and carry particularly preferably 1 to 20, more preferably, 3 to 15, carbon atoms, which are preferably branched.

In still another embodiment, if needed, one or more catalyst can preferably be introduced to the adhesive composition, preferably as a part of the curing composition, to promote the reaction of the epoxide groups of epoxy resins and amine groups of the curing composition. Useful catalysts that may be introduced to the adhesive composition include Ancamide® products available from Evonik Resource Efficiency GmbH and products marketed as "Accelerators" available from the Huntsman Corporation. One exemplary catalyst is piperazine-base Accelerator 399 available from the Huntsman Corporation. When utilized, such catalysts can preferably comprise between 0 and about 10 percent by weight of the total adhesive composition.

Preferably, the curing composition according to the disclosure consists of the above specified components.

[Adhesives]

Based on the curing composition, preferred adhesive compositions can be developed. The adhesive composition comprise the curing composition according to the present disclosure and an epoxy resin.

The adhesive composition can preferably be applied in various sectors, including electrical equipment, sports items, optical equipment, sanitary and hygiene items, household equipment, communications technology, automobile technology, energy and drive technology, mechanical engineering, and medical equipment.

Specifically, a turbine blade including the adhesive composition of the present disclosure can preferably be used in wind energy. Likewise, use of the inventive curing compositions or adhesive compositions for the production of wind turbine blades is particularly preferred.

The disclosure is illustrated by way of example and comparative examples hereinbelow.

EXAMPLES

The following materials were employed in the reference, the examples (Example 1 and Example 2) and the comparative example (CE):

D.E.R.™ 331 Liquid Epoxy Resin from the Dow Chemical Company is a liquid reaction product of epichlorohydrin and bisphenol A.

Viscosity was measured by a Brookfield DV-II+Pro Viscometer at 25° C. Tensile strength and elongation were measured according to ISO 527-2. Glass transition temperature was tested using DSC according to ASTM E1356-08. Peak temperature and exothermic peak duration of 150 g mixture at 40° C. ambient temperature was tested by temperature recorder 2103R (Shanghai Yadu Electronic Technology Co., Ltd.) An exothermic peak duration was measured as the time duration from the mixing of epoxy resin and curing composition to the moment when the mixture reaches its peak temperature. Exothermic peak duration was used herein to determine a rough estimate of pot life.

The Gardner Color scale as specified in ASTM D1544 is used in the present disclosure for grading the color of curing compositions.

Example 1

437.9 g (ca. 0.755 mole) dimerized C18 fatty acid (Jiangsu Yonglin Chemical Oil Co., Ltd.) was added in a four-neck flask filled with nitrogen gas and mixed. Mixing speed was slower than 200 rounds per minute (RPM). 1351.24 g (ca. 3.071 moles) Jeffamine® T403 triamine (commercially available from Huntsman Corporation) was slowly added into the four-neck flask. Then the system was kept at 200° C. for 2 h, then cooled to 120° C. and dried under vacuum. 440.49 g Ancamine® 2168 (commercially available from Evonik Resource Efficiency GmbH) was added into the flask and mixed for 1 h. The color of curing composition was measured to be Gardner 10. Viscosity was 4391 mPa·s. The Ancamine 2168 had a weight percentage of about 19.8% in the final curing composition.

100 g D.E.R.™ 331 and 50 g curing composition obtained in Example 1 was mixed thoroughly. Exothermic peak duration at 40° C. ambient temperature was 112 min. Exothermic peak temperature was 121° C.

100 g D.E.R.™ 331 and 50 g curing composition obtained in Example 1 was mixed thoroughly and then prepared for dumbbell specimens. The curing condition was 75° C. for 5 h. Tensile strength was 73 MPa and elongation was 5.3% according to ISO 527-2. Glass transition temperature was 81° C.

Example 2

437.9 g (ca. 0.755 mole) dimerized C18 fatty acid was placed in a four-neck flask filled with nitrogen gas and mixed. Mixing speed was slower than 200 RPM. 737.0 g (ca. 3.204 moles) Jeffamine® D230 was slowly added into the four-necked flask. Then the system was kept at 200° C. for 2 h. The system was cooled to 120° C. and dried under vacuum. 491.8 g Ancamine® 2168 was added into flask and mixed for 1 h more. Then Example 2 curing compositions was obtained. The color of curing composition was measured to be Gardner 9. Viscosity was 1941 mPa s. The Ancamine 2168 had a weight percentage of about 29.5% in the final curing composition.

102 g D.E.R.™ 331 and 48 g curing composition obtained in Example 2 was mixed thoroughly. Exothermic peak duration at 40° C. ambient temperature was 83 min. Exothermic peak temperature at 40° C. ambient temperature was 119° C.

100 g D.E.R.™ 331 and 47 g curing composition obtained in Example 2 was mixed thoroughly and then prepared for dumbbell specimens. The curing condition was 75° C. for 5 h. Tensile strength was 67 MPa and elongation was 6.0% according to ISO 527-2. Glass transition temperature was 75° C.

Comparative Example 85 g Jeffamine® T403 was placed in a four-neck flask filled with nitrogen gas and mixed. Mixing speed was slower than 200 RPM. 15 g Vestamin® IPD was slowly added into the four-neck flask and mixing for 1 h. Then comparative example curing composition was available.

108 g D.E.R.™ 331 and 42 g curing composition obtained in Comparative Example was mixed thoroughly. Exothermic peak duration at 40° C. ambient temperature was 81 min. Exothermic peak temperature at 40° C. ambient temperature was 157° C.

100 g D.E.R.™ 331 and 39 g curing composition obtained in Comparative Example was mixed thoroughly and then prepared dumbbell sample. The curing condition was 75° C. for 5 h. Tensile strength was 69 MPa and elongation was 4.2% according to ISO 527-2. Glass transition temperature was 87° C.

Various aspects and embodiments are possible. Some of those aspects and embodiments are described herein. After reading this specification, skilled artisans will appreciate that those aspects and embodiments are only illustrative and do not limit the scope of the present disclosure. Embodiments may be in accordance with any one or more of the embodiments as listed below.

EMBODIMENTS

Embodiment 1

A curing composition, comprising:
a) a condensation product of at least one carboxylic acid having 20-60 carbon atoms and at least two carboxyl groups and/or at least one ester derived from a carboxylic acid having 20-60 carbon atoms and at least two carboxyl groups, and at least one polyoxyalkyleneamine, wherein the polyoxyalkyleneamine includes:
I) at least two oxyalkylene moieties; and
II) at least two primary amino groups;
and
b) at least one amine having at least one amino group.

Embodiment 2

The curing composition according to Embodiment 1, wherein the carboxylic acid is a dimerized fatty acid.

Embodiment 3

The curing composition according to Embodiment 1 or 2, wherein the amine is cyclic.

Embodiment 4

The curing composition according to any of the preceding embodiments, wherein the amine has at least two amino groups.

Embodiment 5

The curing composition according to any of the preceding embodiments, wherein the carboxylic acid is a dimerized C16-C20 fatty acid.

Embodiment 6

The curing composition according to any of the preceding embodiments, wherein the oxyalkylene moieties include at least one oxyethylene, oxypropylene, or oxybutylene moiety.

Embodiment 7

The curing composition according to any of the preceding embodiments, wherein the polyoxyalkyleneamine includes

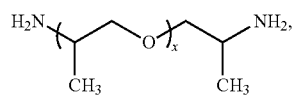

wherein x is an integer ranging from 2 to 70.

Embodiment 8

The curing composition according to any of the preceding embodiments, wherein the polyoxyalkyleneamine includes three primary amino groups.

Embodiment 9

The curing composition according to any of the preceding embodiments, the polyoxyalkyleneamine including

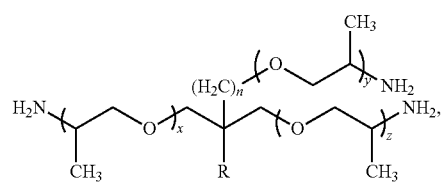

and wherein,
R is a radical selected from H, $CH_3$, $CH_2CH_3$, $CH_2CH_2CH_3$, or $CH(CH_3)_2$;
n is 0 or 1;
x, y, and z are integers independently ranging from 1 to 30; and
the sum of x, y, and z is ranging from 3 to 90.

Embodiment 10

The curing composition according to any of the preceding embodiments, wherein the carboxylic acid and the polyoxyalkyleneamine are within a mole ratio of 0.01-0.8:1, preferably 0.1-0.5:1, more preferably 0.1-0.4:1.

Embodiment 11

The curing composition according to any of the preceding embodiments, wherein the amine has a weight percentage of 1-99 wt. %, preferably 1-90 wt. %, more preferably 1-45 wt. %, still more preferably 5-35 wt. %, in the curing composition.

Embodiment 12

The curing composition according to any of the preceding embodiments, wherein the amine includes at least one five-membered or six-membered ring.

Embodiment 13

The curing composition according to any of the preceding embodiments, wherein the amine includes one or more selected from

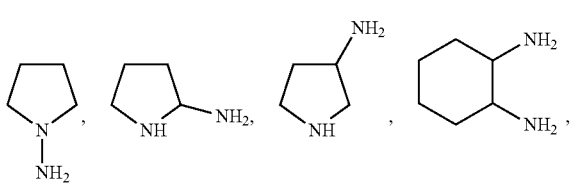

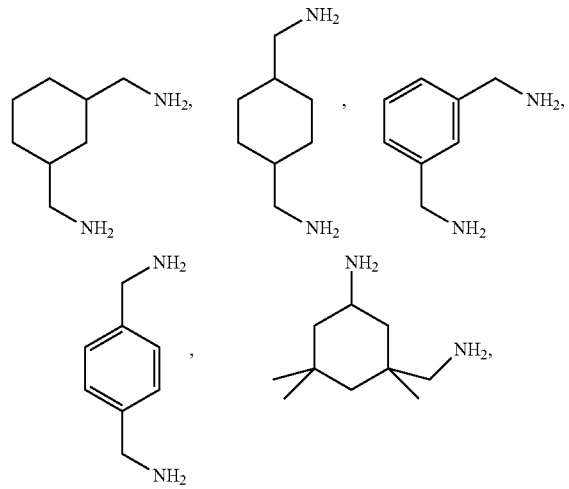

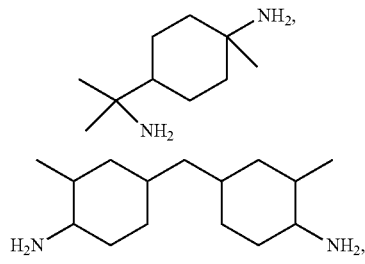

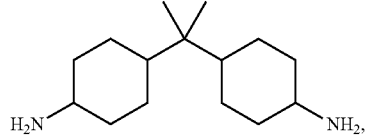

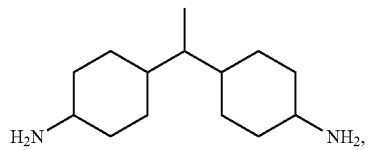

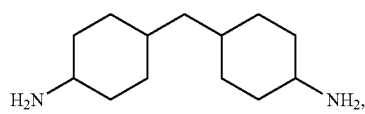

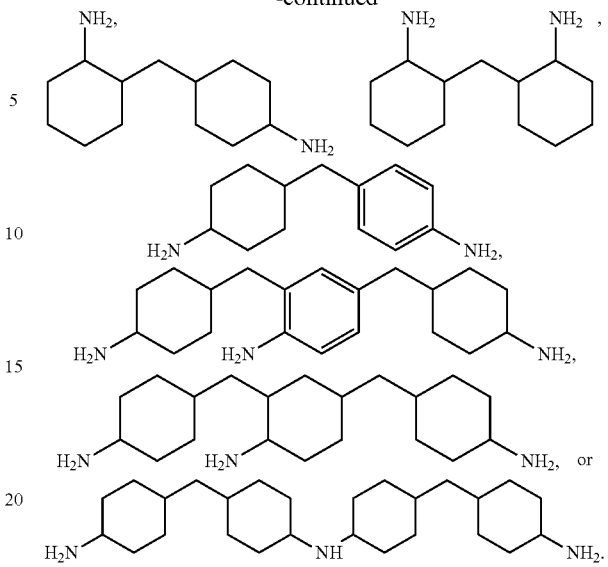

Embodiment 14

The curing composition according to any of the preceding embodiments, further comprising one or more additives selected from the group consisting of fillers, reinforcing agents, coupling agents, toughening agents (toughness improvers), defoamers, dispersants, lubricants, colorants, marking materials, dyes, pigments, IR absorbers, antistats, anti-blocking agents, nucleating agents, crystallization accelerators, crystallization delayers, conductivity additives, carbon black, graphite, carbon nanotubes, graphene, desiccants, de-moulding agents, levelling auxiliaries, flame retardants, separating agents, optical lighteners, rheology additives, photochromic additives, softeners, adhesion promoters, anti-dripping agents, metallic pigments, stabilizers, metal glitters, metal coated particles, porosity inducers, plasticizers, glass fibers, nanoparticles, or flow assistants.

Embodiment 15

The curing composition according to any of the preceding embodiments, wherein the one or more additives constitute a proportion of not greater than 90 wt. %, preferably not greater than 70 wt. %, more preferably not greater than 50 wt. %, still more preferably not greater than 30 wt. %, with respect to a total weight of the adhesive composition.

Embodiment 16

The curing composition according to any of the preceding embodiments, further comprising one or more catalysts.

Embodiment 17

An adhesive composition comprising the curing composition according to any of the preceding embodiments and an epoxy resin.

Embodiment 18

Usage of the adhesive composition according to Embodiment 17 in one of the following sectors: electrical equipment, sports items, optical equipment, sanitary and hygiene items, household equipment, communications technology, automobile technology, energy and drive technology, mechanical engineering, and medical equipment.

Embodiment 19

A turbine blade for wind energy comprising the adhesive composition according to Embodiment 17.

Embodiment 20

A method for manufacturing a curing composition, comprising:
1) heating
   a) at least one carboxylic acid having 20-60 carbon atoms and at least two carboxyl groups and/or at least one ester derived from a carboxylic acid having 20-60 carbon atoms and at least two carboxyl groups; and
   b) at least one polyoxyalkyleneamine, wherein the polyoxyalkyleneamine includes at least one oxyalkylene moiety and at least two primary amino groups;
   to a temperature of 120° C. to 280° C. for 0.5 to 10 hours; and
2) mixing the condensation product with at least one amine.

Embodiment 21

The method according to Embodiment 20, wherein the heating condition is under a non-oxidative atmosphere.

Embodiment 22

The method according to Embodiment 20 or 21, wherein a stoichiometry of the carboxylic acid to the polyoxyalkyleneamine is within a mole ratio of 0.01-0.8:1, preferably 0.01-0.5:1, more preferably 0.1-0.4:1.

The above description is presented to enable a person skilled in the art to make and use the disclosure and is provided in the context of an application and its requirements. Various modifications to the preferred embodiments will be apparent to those skilled in the art, and the generic principles defined herein might be applied to other embodiments and applications without departing from the spirit and scope of the disclosure. Thus, this disclosure is not intended to be limited to the embodiments shown but is to be accorded the widest scope consistent with the principles and features disclosed herein. In this regard, certain embodiments within the disclosure might not show every benefit of the disclosure, considered broadly.

The invention claimed is:

1. A curing composition, consisting of:
   a) a condensation product of:
      at least one carboxylic acid having 20-60 carbon atoms and at least two carboxyl groups and/or at least one ester derived from a carboxylic acid having 20-60 carbon atoms and at least two carboxyl groups; and
      at least one polyoxyalkyleneamine, wherein the polyoxyalkyleneamine includes:
         I) at least two oxyalkylene moieties; and
         II) at least two primary amino groups,
         wherein the carboxylic acid and polyoxyalkyleneamine are within a mole ratio of 0.01-0.8:1; and
   b) at least one amine having at least one primary amino group.

2. The curing composition according to claim 1, wherein the carboxylic acid is a dimerized fatty acid.

3. The curing composition according to claim 1, wherein the amine is cyclic.

4. The curing composition according to claim 1, wherein the amine has at least two amino groups.

5. The curing composition according to claim 1, wherein the carboxylic acid is a dimerized C16-C20 fatty acid.

6. The curing composition according to claim 1, wherein the oxyalkylene moieties include at least one oxyethylene, oxypropylene, or oxybutylene moiety.

7. The curing composition according to claim 1, wherein the polyoxyalkyleneamine includes

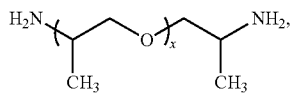

wherein x is an integer ranging from 2 to 70.

8. The curing composition according to claim 1, wherein the polyoxyalkyleneamine includes three primary amino groups.

9. The curing composition according to claim 1, the polyoxyalkyleneamine including

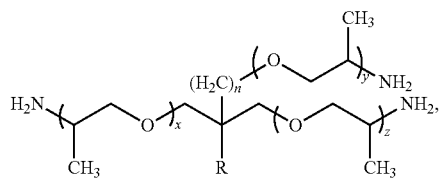

and wherein,
   R is a radical selected from H, CH$_3$, CH$_2$CH$_3$, CH$_2$CH$_2$CH$_3$, or CH(CH$_3$)$_2$;
   n is 0 or 1;
   x, y, and z are integers independently ranging from 1 to 30; and
   the sum of x, y, and z is ranging from 3 to 90.

10. The curing composition according to claim 1, wherein the carboxylic acid and the polyoxyalkyleneamine are within a mole ratio of 0.1-0.5:1.

11. The curing composition according to claim 1, wherein the amine has a weight percentage of 1-99 wt. % in the curing composition.

12. The curing composition according to claim 1, wherein the amine includes at least one five-membered or six-membered ring.

13. The curing composition according to claim 1, wherein the amine includes one or more selected from the group consisting of:

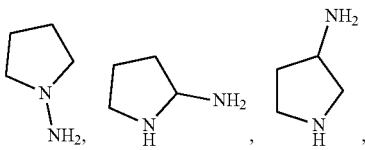

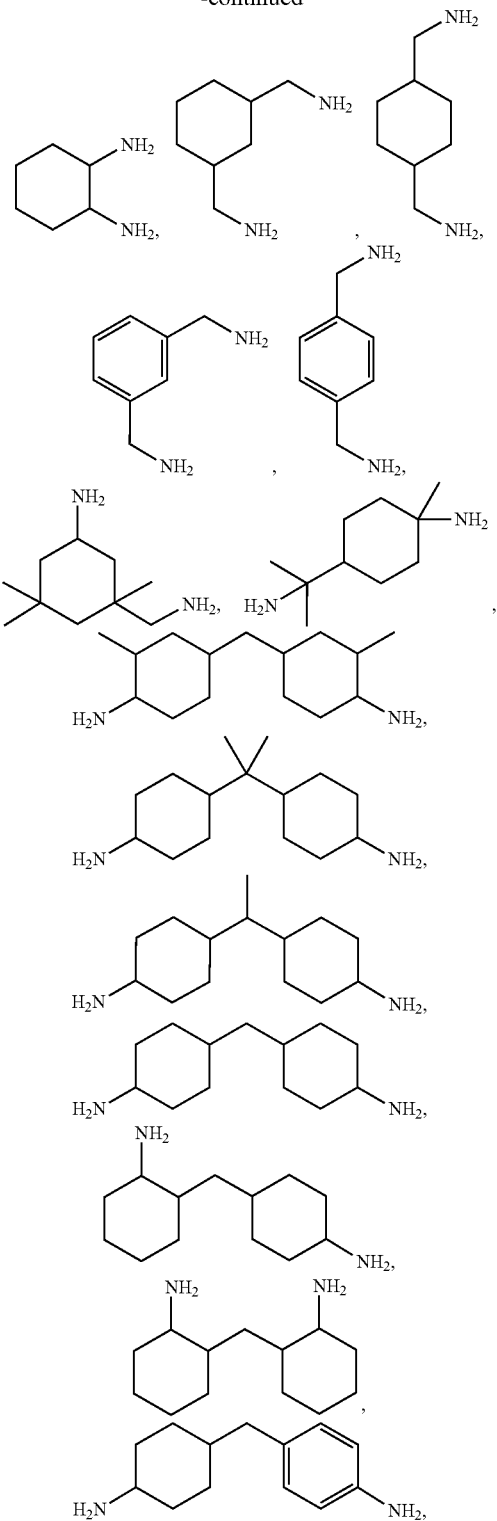

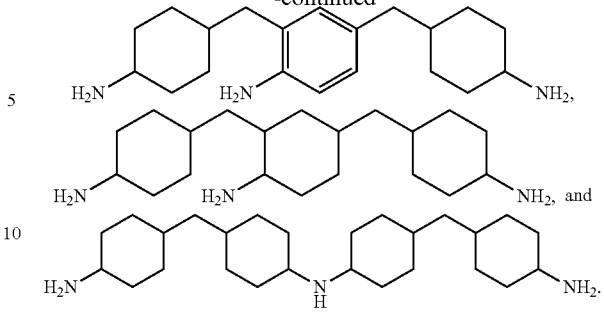

14. An adhesive composition comprising the curing composition according to claim 1 and an epoxy resin.

15. A turbine blade for wind energy comprising the adhesive composition according to claim 14.

16. A method for manufacturing a curing composition, comprising:
  1) heating
    a) at least one carboxylic acid having 20-60 carbon atoms and at least two carboxyl groups and/or at least one ester derived from a carboxylic acid having 20-60 carbon atoms and at least two carboxyl groups; and
    b) at least one polyoxyalkyleneamine, wherein the polyoxyalkyleneamine includes at least one oxyalkylene moiety and at least two primary amino groups to a temperature of 120° C. to 280° C. for 0.5 to 10 hours, wherein the carboxylic acid and polyoxyalkyleneamine are within a mole ratio of 0.1-0.4; and
  2) mixing the condensation product with at least one amine having at least one primary amino group.

17. The method according to claim 16, wherein the heating condition is under a non-oxidative atmosphere.

18. The method according to claim 16, further comprising mixing the condensation product and the at least one amine with one or more additives selected from the group consisting of fillers, reinforcing agents, coupling agents, toughening agents, defoamers, dispersants, lubricants, colorants, marking materials, dyes, pigments, IR absorbers, antistats, anti-blocking agents, nucleating agents, crystallization accelerators, crystallization delayers, conductivity additives, carbon black, graphite, carbon nanotubes, graphene, desiccants, de-moulding agents, levelling auxiliaries, flame retardants, separating agents, optical lighteners, rheology additives, photochromic additives, softeners, adhesion promoters, anti-dripping agents, metallic pigments, stabilizers, metal glitters, metal coated particles, porosity inducers, plasticizers, glass fibers, nanoparticles, and flow assistants.

19. The method according to claim 18, wherein the one or more additives constitute a proportion of not greater than 90 wt. %, with respect to a total weight of the curing composition.

20. The method according to claim 16, further comprising mixing the condensation product and the at least one amine with one or more catalysts.

\* \* \* \* \*